Figures 1, 2:
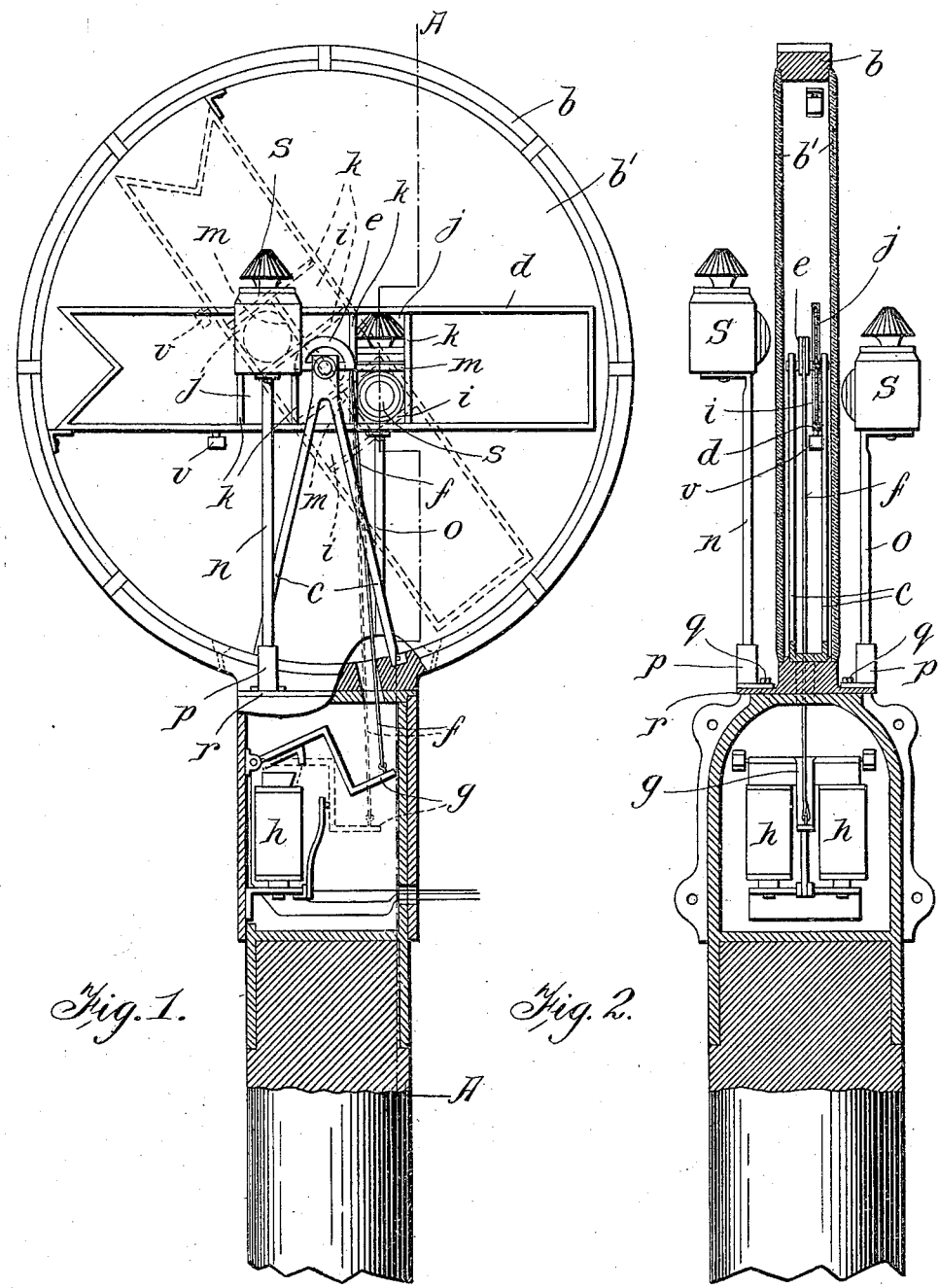

W. J. McSHANE.
SEMAPHORE.
APPLICATION FILED JUNE 3, 1909.

966,350.

Patented Aug. 2, 1910.

Witnesses

William J. McShane
Inventor
By Attorney

THE NORRIS PETERS CO., WASHINGTON, D. C.

UNITED STATES PATENT OFFICE.

WILLIAM JAMES McSHANE, OF ST. JOHN, NEW BRUNSWICK, CANADA, ASSIGNOR TO T. McAVITY & SONS LIMITED, OF ST. JOHN, CANADA, A CORPORATION.

SEMAPHORE.

966,350.  Specification of Letters Patent.  Patented Aug. 2, 1910.

Application filed June 3, 1909.  Serial No. 499,889.

*To all whom it may concern:*

Be it known that I, WILLIAM JAMES MC-SHANE, of the city of St. John, in the Province of New Brunswick, Canada, have invented certain new and useful Improvements in Semaphores; and I do hereby declare that the following is a full, clear, and exact description of the same.

My invention relates to the type of semaphores disclosed in Canadian Patent No. 122,649, and may be said briefly to consist of the combination and arrangement of parts hereinafter described and pointed out in the claims.

For full comprehension, however of the invention reference must be had to the accompanying drawing forming a part of this specification in which similar reference characters indicate the same parts and wherein—

Figure 1 is a side elevation of my improved semaphore; Fig. 2 is a vertical sectional view thereof taken on line A A Fig. 1.

The frame $b$, lenses $b'$, standards $c$, and the segment $e$, a cord $f$ and armature lever $g$ acting in conjunction with magnets $h$, for operating the banner, are constructed as formerly.

According to my invention the banner arm $d$ has disposed at opposite sides of and near its center two pairs of colored glasses $i$, $i$, and $j$ $j$. The glasses $i$ $i$ being red and $j$ $j$ being green the glasses of each pair being placed one above the other the red glass being uppermost at one side and lowermost at the other side when the banner arm is in danger position which position such banner arm is caused to assume by weight $v$. These colored glasses are mounted in frames formed by two pairs of cross-pieces $k$ situated within and fixed to the side pieces of the banner arm, and a pair of longitudinal pieces $m$ fastened between the cross-pieces of the respective pairs thus forming the four frames necessary to receive the colored glasses.

A pair of posts $n$ and $o$ supported in sockets $p$ fastened preferably by screws $q$ to the base $r$ of the frame $b$ at opposite sides of the said frame $b$ carry lamps $s$ at their upper ends. The heights of these posts with relation to the center of the banner arm is such that the lamps are located in line with the red glasses, when such banner arm is in horizontal position and therefore indicating danger.

When the operator changes the signal by closing an electric circuit which energizes the magnets and causes the armature to draw down the cord $f$ and rotate the segment $e$, and tilt the banner arm, the green glasses are brought opposite to the lamps.

When the "danger" signal is again necessary the operator opens the electric circuit, thus releasing the banner arm and permitting it to fall to horizontal position which restores the red glasses to position before the lamps. This position is also assumed automatically by the arm owing to the weight $v$, if the current should fail.

What I claim is as follows:—

1. In a semaphore of the type described, a frame carrying a pair of lenses and containing a pivoted banner-arm having two pairs of colored glasses located at opposite sides of its pivot point, a pair of lamps facing in opposite directions and disposed with the said carrying frame between them, and means whereby the said banner arm is swung to place either glass of each pair before the lamps.

2. In a semaphore of the type described, a frame carrying a pair of lenses and containing a pivoted banner-arm having two pairs of colored glasses located at opposite sides of and adjacent to its pivot point, a pair of lamps disposed at opposite sides of the frame and facing in opposite directions and means whereby the said banner arm is swung to place either glass of each pair before the lamps.

3. The combination of a circular frame $b$; an oblong banner arm $d$ within the frame $b$; cross-pieces $k$ and longitudinal pieces $m$ subdividing the banner arm; colored glasses $i$, $i$, $j$, $j$, set in the subdivisions; sockets $p$; posts $n$, $o$; lamps $s$ set in the sockets to face in opposite directions; and means for tilting the said banner arm.

In testimony whereof, I have signed my name to this specification, in the presence of two subscribing witnesses.

WILLIAM JAMES McSHANE.

Witnesses:
FRANK RUDOLPH BARBOUR,
CHARLES ATTWOOD ATKINSON.